United States Patent [19]

Fenton

[11] Patent Number: 4,526,604

[45] Date of Patent: Jul. 2, 1985

[54] MOULD ARRANGEMENT FOR A CYCLICLY-OPERATING GLASSWARE CONTAINER MANUFACTURING MACHINE WITH TEMPERATURE SENSING MEANS

[75] Inventor: Frank A. Fenton, Doncaster, England

[73] Assignee: Emhart Industries, Inc., Farmington, Conn.

[21] Appl. No.: 584,027

[22] Filed: Feb. 27, 1984

[30] Foreign Application Priority Data

Mar. 7, 1983 [GB] United Kingdom ............... 8306146

[51] Int. Cl.³ ............................................. C03B 9/38
[52] U.S. Cl. ........................................ 65/158; 65/83; 65/162; 65/267; 65/319
[58] Field of Search ............... 65/29, 83, 265, 162, 65/319, 267, 356, 158; 136/213, 236.1, 239

[56] References Cited

U.S. PATENT DOCUMENTS

| 3,332,765 | 7/1967 | Champlin | 65/267 X |
| 3,494,199 | 2/1970 | Stacey | 65/29 X |
| 3,810,747 | 5/1974 | Bork | 65/162 X |

FOREIGN PATENT DOCUMENTS

WO82/02882 9/1982 PCT Int'l Appl.
WO82/02881 9/1982 PCT Int'l Appl.

Primary Examiner—Arthur Kellogg
Attorney, Agent, or Firm—Arthur B. Moore

[57] ABSTRACT

A member which acts to close an upwardly-facing opening of a mould cavity e.g. a baffle or a blowhead, carries a portion of a temperature detecting device which is operable to detect the temperature of at least one of the side mould portions of the mould. When the member is in its operative position in which it closes the opening of the mould cavity, the temperature of the mould portion is detected.

10 Claims, 5 Drawing Figures

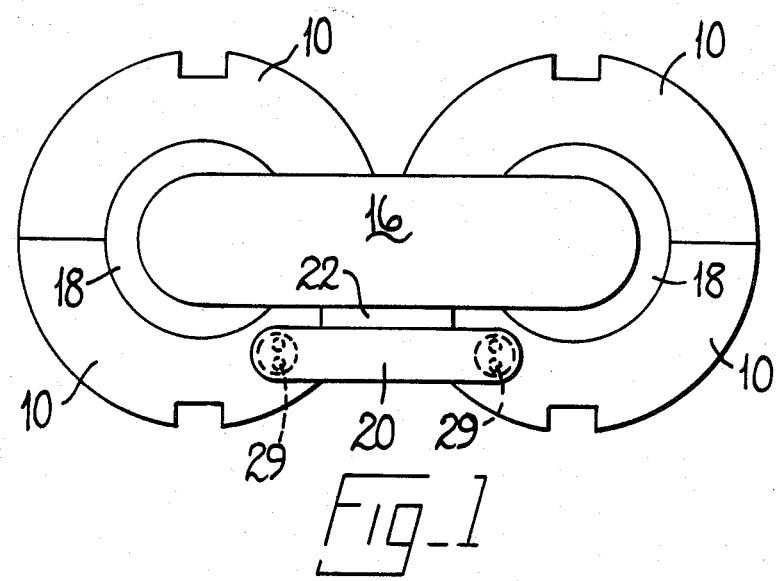
Fig_1
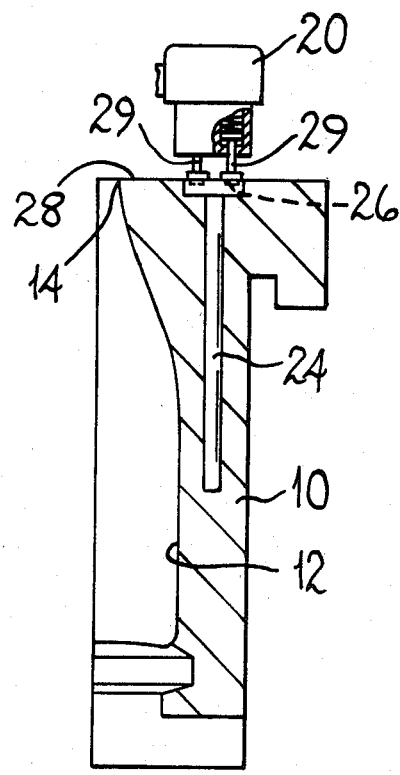
Fig_2
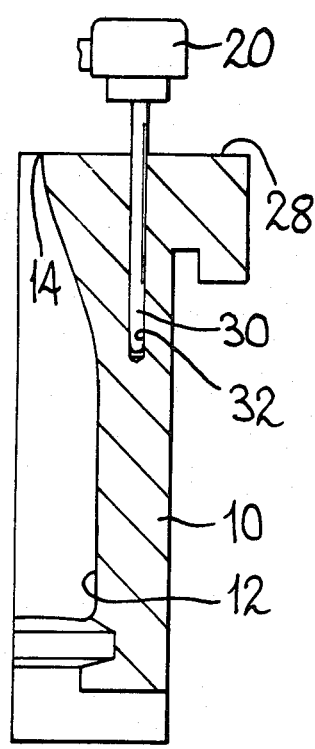
Fig_3

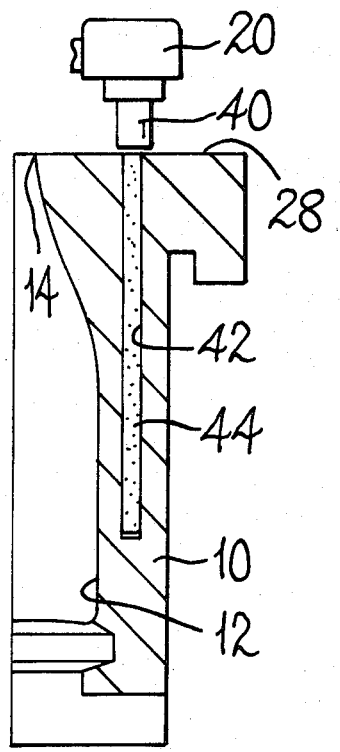
Fig_4
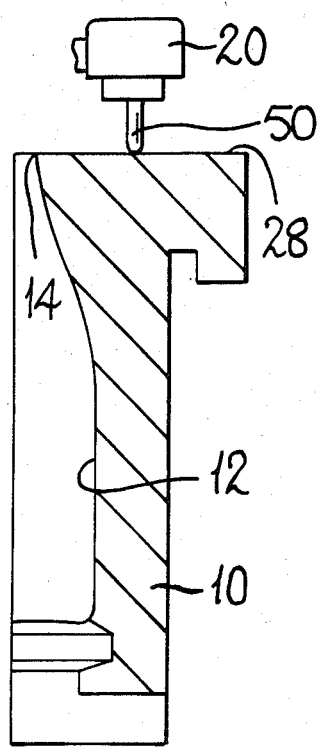
Fig_5

MOULD ARRANGEMENT FOR A CYCLICLY-OPERATING GLASSWARE CONTAINER MANUFACTURING MACHINE WITH TEMPERATURE SENSING MEANS

BACKGROUND OF THE INVENTION

This invention is concerned with a mould arrangement for a cyclicly-operating glassware container manufacturing machine comprising two side mould portions movable relative to one another between a mould closed position in which the side mould portions co-operate to define a mould cavity with an upwardly-facing opening and a mould open position in which moulded articles can be removed from the mould.

In glassware container manufacturing machines, moulds are used both for shaping the finished article and for preliminary shaping of the glass to form parisons which are then transferred to further moulds. All these moulds need to be maintained in a particular temperature range to ensure correct operation of the machine since, if the moulds become too hot, the glass will stick to them whereas, if the moulds become too cold, the glass will not be correctly shaped. To enable the temperature of the moulds to be controlled, glassware container manufacturing machines comprise mould cooling means operable to cool the moulds during the operation of the machine. The cooling means must be controlled so that it cools the mould sufficiently but not excessively. In most glassware container manufacturing machines, the cooling means is at present controlled by an operator by a trial-and-error method which leads frequently to the manufacture of incorrect articles until the operator finds the correct setting for the cooling means. Attempts to automate the control of the cooling means are complicated by the fact that the mould is inaccessible for temperature sensing means since it is substantially surrounded by parts of the machine. In the case of a parison mould, the sides of the mould are inaccessible because of the mould side portion supporting and moving means, the bottom of the mould is inaccessible because of the presence of either blowing means or plunger moving means used to shape the parison in the mould, and the top of the mould is inaccessible because of the need to provide access for a funnel to guide a gob of molten glass into the mould and for a baffle to close the opening in the mould after removal of the funnel so that the shaping of the parison can take place. In the case of the final mould in which parisons are blown to their final shape, the sides of the mould are inaccessible due to the presence of mould side portion supporting and moving means and of cooling means for the mould, the bottom of the mould is inaccessible because of the presence of a vacuum applying bottom plate through which vacuum is applied to the interior of the mould, and the top of the mould is inaccessible because of the need to provide access for parisons entering the mould and for a blowhead to engage the mould so that air can be blown through the blowhead into a parison in the mould to form the parison to the mould.

One means for achieving access to the mould for temperature sensing means is described in European Patent Specification No. 59580 in the name of Emhart Industries, Inc. in this method, a thermocouple is embedded in the mould side portion and this thermocouple has electrical connections which make contact with fixed electrical connections when the mould side portion is in a mould open position thereof. When the electrical connections are in contact, the reading of the thermocouple is taken and the cooling means is controlled in accordance with the reading of the thermocouple. This method is satisfactory in the type of machine shown in the aforementioned European patent specification in which the cooling means is incorporated in the mould side portion supporting and moving means and in which the mould side portions are moved linearly to and from their mould open and closed positions. However, this method is not readily applicable to other types of glassware container manufacturing machine in which the cooling is provided by means of a cooling stack having nozzles surrounding the mould and the mould side portion is moved arcuately between its mould open and closed positions.

It is an object of the present invention to provide a mould arrangement for a cyclicly-operating glassware container manufacturing machine which can be used in a wide range of machines and in which a temperature detecting device is able to detect the temperature of the mould of the arrangement.

BRIEF SUMMARY OF THE INVENTION

The invention provides a mould arrangement for a cyclicly-operating glassware container manufacturing machine comprising two side mould portions movable relative to one another between a mould closed position in which the side mould portions co-operate to define a mould cavity with an upwardly-facing opening and a mould open position in which moulded articles can be removed from the mould, and a mould opening closing member mounted on a support for movement between an operative position thereof, in which the member engages the side portions and closes the upwardly-facing opening of the mould cavity, and an out-of-the-way position thereof, characterised in that the support also carries at least a portion of a temperature detecting device which is operable to detect the temperature of at least one of the side mould portions when the member is in its operative position.

Where the mould of the mould arrangement is a parison mould defining a cavity in which gobs of molten glass are moulded into parisons which are subsequently transferred to a final mould for forming into a finished container, the mould opening closing member is a baffle having a surface portion closing the opening.

Where the mould of the mould arrangement is a final mould defining a cavity in which parisons of molten glass transferred from a parison mould are formed into a finished container, the mould opening closing member is a blowhead defining a passage through which parison-blowing air can be introduced into the mould cavity.

The temperature detecting device may comprise a thermocouple embedded in one of the side mould portions and electrical connecting members therefor carried on the support and arranged to make electrical connection with a thermocouple when the member is in its operative position. Alternatively the temperature detecting device may comprise a thermocouple mounted on the support for movement therewith and arranged, when the member is in its operative position, to project into a vertical passage in one of the side mould portions, by both these temperature detecting devices, the temperature within the side mould portion can be detected.

Where the mould portion has cooling passages therein through which cooling air flows, the temperature detecting device may comprise a thermocouple mounted on the support for movement therewith and arranged, when the member is in its operative position, to project into air exiting from the cooling passage to detect the temperature of the air and therefore of the mould portion.

The temperature detecting device may comprise a thermocouple mounted on the support for movement therewith and arranged, when the member is in its operative position, to engage an upper surface portion of one of the side mould portions. This type of detecting device can be used when it is found that the temperature of the surface of the side mould portion is a sufficient indication of the temperature of the mould to enable the cooling means to be controlled with reference to that temperature.

The temperature detecting device may comprise an infra-red radiation sensing head either mounted on the support for movement therewith and arranged, when the member is in its operative position, to receive infra-red radiation from one of the side mould portions or arranged to receive radiation from a flexible fibre optic guide one end of which is mounted on the support. In order to deliver infra-red radiation originating from within the side mould portion to the infra-red radiation sensing head, the infra-red sensing head may be aligned, when the member is in its operative position, with a passage in the side mould portion extending from an upper surface thereof to a position adjacent to a mould cavity defining surface of the side mould portion, the passage containing an infra-red radiation transmitting device.

BRIEF DESCRIPTION OF THE DRAWINGS

There now follows a detailed description, to be read with reference to the accompanying drawings of four mould arrangements which are illustrative of the invention.

It is to be understood that the four illustrative mould arrangements have been selected for description by way of example and not of limitation of the invention.

In the drawings:

FIG. 1 is a plan view of the first illustrative mould arrangement; and

FIGS. 2, 3, 4 and 5 are cross-sectional views taken vertically through side mould portions of the first, second, third and fourth illustrative mould arrangements respectively.

DETAILED DESCRIPTION OF PREFERRED EMBODIMENT OF THE INVENTION

The first illustrative mould arrangement shown in FIG. 1 comprises two adjacent final moulds for use in a cyclicly-operating glassware container manufacturing machine. Each final mould comprises two side mould portions 10 which are movable relative to one another between a mould closed position (in which they are shown in FIG. 1) in which the side mould portions 10 co-operate to define a mould cavity 12 with an upwardly facing opening 14 (see FIG. 2) and a mould open position (not shown) in which moulded articles can be removed from the mould. The first illustrative mould arrangement also comprises a support 16 on which two mould opening closing members 18, one for each mould, are mounted for movement between an operative position thereof (shown in FIG. 1) in which the members 18 engage the side portions 10 and close the upwardly-facing opening 14 of the respective mould cavities 12, and an out-of-the-way position thereof. The members 18 are blowheads which are moved by moving means of well known type between their operative and out-of-the-way positions and the side mould portions 10 are supported by mould portion supporting and moving means (not shown) of well known type which moves the portions 10 arcuately to and from their mould open and closed positions.

The support 16 of the first illustrative mould arrangement also carries a portion of a temperature detecting device which is operable to detect the temperature of at least one of the side mould portions 10 of each of the moulds when the blowhead 18 is in its operative position. The portion of the temperature detecting device is mounted on a bar 20 which is in turn mounted on a sideways projection 22 of the support 16. The temperature detecting device comprises a thermocouple 24 (see FIG. 2) embedded in one of the side mould portions 10 and having electrical contacts 26 at an upper surface 28 of the mould portion 10. The portion of the temperature detecting device which is carried by the support 16 comprises two spring loaded electrical contacts 29 which are arranged to make electrical connection with the contacts 26 of the thermocouple 24 when the blowhead 18 is in its operative position. When the contacts 26 and 29 are in electrical connection with each other, the temperature indicated by the thermocouple 24 is read by apparatus described in the aforementioned European Patent Specification No. 59580 and this temperature is used to control cooling means for the moulds (not shown).

The first illustrative mould arrangement is a final mould arrangement defining a cavity 12 in which parisons of molten glass are moulded into containers and the mould opening 14 closing member is a blowhead 18. However, a substantially identical mould arrangement can be a parison mould arrangement defining a cavity in which gobs of molten glass are moulded into parisons and the mould opening closing member is a baffle.

The second, third and fourth illustrative mould arrangements are substantially identical to the first illustrative mould arrangement except that they employ different temperature detecting devices. Accordingly, like parts in FIGS. 3, 4 and 5 to the parts of the first illustrative mould arrangement shown in FIG. 2 are given identical reference numerals and only the temperature detecting devices of the second, third and fourth mould arrangements will be described hereinafter.

The temperature detecting device of the second illustrative mould arrangement shown in FIG. 3 comprises a thermocouple 30 which is mounted on the bar 20 of the support 16 for movement therewith and is arranged when the blowhead 18 is in its operative position to project into a vertical passage 32 in one of the side mould portions 10 which extends downwardly from the surface 28 to a position adjacent the mould cavity 12. As the blowhead 18 is moved vertically downwards into its operative position the thermocouple 30 progressively enters the passage 32 until it reaches its final position (shown in FIG. 3) at which time the temperature is sensed.

The temperature detecting device of the third illustrative mould arrangement shown in FIG. 4 comprises an infra-red radiation sensing head 40 mounted on the bar 20 of the support 16 for movement therewith and arranged, when the blowhead 18 is in its operative position, to receive infra-red radiation from one of the side mould portions 10. When the blowhead 18 is in its operative position, the infra-red radiation sensing head 40 is aligned with a passage 42 in the side mould portion 10 extending from the upper surface 28 of the portion 10 to a position adjacent the mould cavity defining surface 12 of the side mould portion 10. The passage 42 contains an infra-red radiation transmitting device in the form of a silica rod 44. The silica rod 44 acts to transmit radiation from the position adjacent to the mould cavity defining surface 12 to the infra-red sensing head 40 so that the head 40 can detect the temperature of that position using radiation originating from that position. In modifications of the third illustrative mould arrangement, the silica rod 44 may be replaced by a glass rod, a bundle of optical fibres, or an aluminium tube. In other modifications of the third illustrative mould arrangement, the infra-red sensing head is fixedly mounted and a flexible fibre optic guide, one end of which is mounted on the support and which flexes with the movement thereof, is used to transmit the radiation to the sensing head.

The temperature detecting device of the fourth illustrative mould arrangement shown in FIG. 5 comprises a thermocouple 50 mounted on the bar 20 of the support 16 for movement therewith and is arranged, when the blowhead 18 is in its operative position, to engage the upper surface 28 of the side mould portion 10. Thus, the temperature of the surface 28 is used to control the cooling means of the machine.

I claim:

1. An improved mould arrangement for a cyclicly-operating glassware container manufacturing machine, of the type including two side mould portions movable relative to one another between a mould closed position in which the side mould portions co-operate to define a mould cavity with an upwardly-facing opening and a mould open position in which moulded articles can be removed from the mould; a mould closing member mounted on a support for movement between an operative position thereof, in which the member engages the side portions and closes the upwardly-facing opening of the mould cavity, and out-of-the-way position thereof; and a device for detecting the temperature of said mould;
   wherein the improvement comprises an improved device for detecting the temperature of said mould, comprising a thermocouple mounted on the support for movement therewith, positioned to detect the temperature on or near one of the side mould portions when the member is in its operative position.

2. An improved mould arrangement as defined in claim 1, wherein the thermocouple contacts an upper surface portion of the one of the side mould portions when the member is in its operative position.

3. An improved mould arrangement as defined in claim 2, wherein the thermocouple projects into a vertical passage in said one of the side mould portions when the member is in its operative position.

4. An improved mould arrangement as defined in claim 1, wherein the thermocouple projects into air exiting from a cooling passage in said one of the side mould portions wherein the member is in its operative position.

5. An improved mould arrangement for a cyclicly-operating glassware container manufacturing machine, of the type including two side mould portions movable relative to one another between a mould closed position in which the side mould portions co-operate to define a mould cavity with an upwardly-facing opening and a mould open position in which moulded articles can be removed from the mould; a mould closing member mounted on a support for movement between an operative position thereof, in which the member engages the side portions and closes the upwardly-facing opening of the mould cavity, and out-of-the-way position thereof; and a device for detecting the temperature of said mould;
   wherein the improvement comprises an improved device for detecting the temperature of said mould, comprising a thermocouple embedded in one of the side mould portions and an electrical connecting member therefor carried on the support and positioned to make electrical connection with the thermocouple when the member is in its operative position.

6. An improved mould arrangement for a cyclicly-operating glassware container manufacturing machine, of the type including two side mould portions movable relative to one another between a mould closed position in which the side mould portions co-operate to define a mould cavity with an upwardly-facing opening and a mould open position in which moulded articles can be removed from the mould; a mould closing member mounted on a support for movement between an operative position thereof, in which the member engages the side portions and closes the upwardly-facing opening of the mould cavity, and out-of-the-way position thereof; and a device for detecting the temperature of said mould;
   wherein the improvement comprises an improved device for detecting the temperature of said mould, comprising an infra-red radiation sensing head mounted on the support for movement therewith and positioned, when the member is in its operative position, to receive infra-red radiation from one of the side mould portions.

7. A mould arrangement according to claim 6, wherein when the member is in its operative position, the infra-red radiation sensing head is aligned with a passage in the side mould portion extending from an upper surface thereof to a position adjacent a mould cavity defining surface of the side mould portion the passage containing an infra-red radiation transmitting device.

8. An improved mould arrangement for a cyclicly-operating glassware container manufacturing machine, of the type including two side mould portions movable relative to one another between a mould closed position in which the side mould portions co-operate to define a mould cavity with an upwardly-facing opening and a mould open position in which moulded articles can be removed from the mould; a mould losing member mounted on a support for movement between an operative position thereof, in which the member engages the side portions and closes the upwardly-facing opening of the mould cavity, and out-of-the-way position thereof; and a device for detecting the temperature of said mould;
   wherein the improvement comprises an improved device for detecting the temperature of said mould, comprising an infra-red radiation sensing head mounted on the support for movement therewith and arranged, when the member is in its operative position, to receive infra-red radiation from one of the side mould portions, wherein when the member is in its operative position, the infra-red radiation sensing head is aligned with a passage in the side mould portion extending from an upper surface thereof to a position adjacent a mould cavity defining surface of the side mould portion the passage containing an infra-red radiation transmitting device.

9. An improved mould arrangement for a cyclicly-operating glassware container manufacturing machine, of the type including two side mould portions movable relative to one another between a mould closed position in which the side mould portions co-operate to define a mould cavity with an upwardly-facing opening and a mould open position in which moulded articles can be removed from the mould; a mould closing member mounted on a support for movement between an operative position thereof, in which the member engages the side portions and closes the upwardly-facing opening of the mould cavity, and out-of-the-way position thereof; and a device for detecting the temperature of said mould;

wherein the improvement comprises an improved device for detecting the temperature of said mould, comprising an infra-red radiation sensing head and a flexible fibre optic guide arranged to transmit infra-red radiation to the sensing head, one end of the guide being mounted on the support for movement therewith and positioned, when the member is in its operative position, to receive infra-red radiation from one of the side mould portions.

10. A mould arrangement according to claim 9, wherein when the member is in its operative position, the end of the guide mounted on the support, is aligned with a passage in the side mould portion extending from an upper surface thereof to a position adjacent a mould cavity defining surface of the side mould portion, the passage containing an infra-red radiation transmitting device.

* * * * *